(12) United States Patent
Adams et al.

(10) Patent No.: US 10,280,997 B2
(45) Date of Patent: May 7, 2019

(54) METHOD FOR CONTROLLING A HYDRODYNAMIC RETARDER THAT CAN BE MECHANICALLY DISENGAGED BY A DISCONNECT CLUTCH

(71) Applicant: Voith Patent GmbH, Heidenheim (DE)

(72) Inventors: Werner Adams, Crailsheim (DE); Dieter Laukemann, Crailsheim (DE); Achim Menne, Crailsheim (DE); Ravi Schade, Crailsheim (DE)

(73) Assignee: Voith Patent GmbH, Heidenheim (DE)

( * ) Notice: Subject to any disclaimer, the term of this patent is extended or adjusted under 35 U.S.C. 154(b) by 617 days.

(21) Appl. No.: 14/960,767

(22) Filed: Dec. 7, 2015

(65) Prior Publication Data

US 2016/0084332 A1  Mar. 24, 2016

Related U.S. Application Data

(63) Continuation of application No. PCT/EP2014/057579, filed on Apr. 15, 2014.

(30) Foreign Application Priority Data

Jun. 7, 2013  (DE) .................. 10 2013 009 534

(51) Int. Cl.
*F16D 67/02* (2006.01)
*B60T 10/02* (2006.01)
(Continued)

(52) U.S. Cl.
CPC .............. *F16D 67/02* (2013.01); *B60T 10/02* (2013.01); *F16D 57/005* (2013.01); *F16D 57/02* (2013.01); *F16D 57/04* (2013.01)

(58) Field of Classification Search
CPC .......... F16D 67/02; F16D 57/02; F16D 57/04; F16D 57/005; B60T 10/02
See application file for complete search history.

(56) References Cited

U.S. PATENT DOCUMENTS

| 9,291,220 B2 | 3/2016 | Menne et al. |
| 2013/0225365 A1* | 8/2013 | Huth .................. B60T 10/02 477/59 |

(Continued)

FOREIGN PATENT DOCUMENTS

| DE | 10 2009 001 146 A1 | 8/2010 |
| DE | 10 2011 120 626 A1 | 6/2013 |

(Continued)

OTHER PUBLICATIONS

Communication Regarding the Transmission of the International Search Report and the Written Opinion of the International Searching Authority or Declaration dated May 26, 2015 for International Application No. PCT/EP2014/057579 (11 pages).

*Primary Examiner* — Huan Le
(74) *Attorney, Agent, or Firm* — Taylor IP, P.C.

(57) ABSTRACT

A method for controlling a hydrodynamic retarder in a motor vehicle that can be mechanically disengaged via a disconnect clutch, whereby at least one of the rotational speed of a revolving bladed rotor and the speed of a motor vehicle is monitored and a disconnect clutch is engaged below at least one of a pre-specified rotational speed of the revolving bladed rotor and a pre-specified speed of the motor vehicle, regardless of a request made by a driver assist system or by operation of an input device by the operator of the motor vehicle to turn on the hydrodynamic retarder.

15 Claims, 1 Drawing Sheet

(51) Int. Cl.
*F16D 57/04* (2006.01)
*F16D 57/00* (2006.01)
*F16D 57/02* (2006.01)

(56) References Cited

U.S. PATENT DOCUMENTS

| | | | | |
|---|---|---|---|---|
| 2014/0081528 A1* | 3/2014 | Menne | ................... | B60T 10/02 |
| | | | | 701/48 |
| 2014/0151176 A1 | 6/2014 | Menne et al. | | |
| 2014/0311840 A1* | 10/2014 | Menne | ................... | B60K 6/12 |
| | | | | 188/290 |
| 2014/0330495 A1* | 11/2014 | Menne | ................... | B60T 10/02 |
| | | | | 701/68 |

FOREIGN PATENT DOCUMENTS

| | | | |
|---|---|---|---|
| WO | 2014/116177 A1 | 7/2014 | |
| WO | 2014/195051 A2 | 12/2014 | |

\* cited by examiner

METHOD FOR CONTROLLING A HYDRODYNAMIC RETARDER THAT CAN BE MECHANICALLY DISENGAGED BY A DISCONNECT CLUTCH

CROSS REFERENCE TO RELATED APPLICATIONS

This is a continuation of PCT application No. PCT/EP2014/057579, entitled "METHOD FOR CONTROLLING A HYDRODYNAMIC RETARDER THAT CAN BE MECHANICALLY DISENGAGED BY A DISCONNECT CLUTCH", filed Apr. 15, 2014, which is incorporated herein by reference.

BACKGROUND OF THE INVENTION

1. Field of the Invention

The invention relates to a method for controlling a hydrodynamic retarder in a motor vehicle that can be mechanically disengaged via a disconnect clutch.

2. Description of the Related Art

In order to reduce the no-load losses of a hydrodynamic retarder to zero, it has already been suggested to disengage the hydrodynamic retarder during a non-braking mode by means of a disconnect clutch from the drive train which it is intended to brake in the braking-mode. During the transition from braking mode to non-braking mode, the working chamber is at the same time drained of working medium which, in the braking mode transfers a hydrodynamic circulation in the working chamber for transmission of torque from the rotor to the stator; or, in the case of a counter-rotating retarder, from the rotor to a counter-rotating rotor rotating in opposite direction, and therefore brakes the rotor and with it the driving drive train.

Turning on and turning off a hydrodynamic retarder is generally controlled by an electronic control device, whereby the electronic control device receives requests in regard to turning on or turning off; or in regard to adjustment of a certain braking torque or respectively a certain braking stage either from the vehicle's operator who operates a relevant input device, for example a control lever, or in certain arrangements also from a driver assist system, for example a speed control system or a distance maintaining system of the vehicle. When for example the electronic control device detects a request to turn off the retarder it will effect draining of the working chamber of working medium and disengaging of the disconnect clutch.

With regard to traffic safety and comfort it is important that demands in regard to turning on, turning off or adjusting of a certain braking torque of the hydrodynamic retarder are implemented as rapidly as possible. The goal is for example, implementation of a specific request in less than one second or even less than 0.5 seconds. It is therefore understandable that when, for example a request for turning off the retarder has been detected, draining of the working chamber and disengaging of the disconnect clutch is commonly implemented immediately and expediently.

In practical application it has been shown that the desired reaction times can generally be adhered to. However, especially with frequent turning on and turning off of hydrodynamic retarders that are mechanically disengaged from the drive train during the transition from braking mode to non-braking mode and are again connected during transition from non-braking mode to braking mode through frictional slip shunting in the disconnect clutch, the wear and tear in the clutch is relatively high and the maintenance cost accordingly great.

In the post-published German patent application DE 10 2011 120 626 it is therefore suggested to implement delayed disengaging of the disconnect clutch during the transition from braking mode to non-braking mode, whereby the time span of the delay occurs subject to various state variables of the hydrodynamic retarder. The number of necessary synchronizations of the disconnect clutch can thereby be reduced and the service life of the disconnect clutch be increased.

Even though the wear on the disconnect clutch can be considerably reduced through the aforementioned measures there are still situations where the disconnect clutch is subject to especially high wear, reducing its service life.

It is therefore the objective of the current invention to provide a method to control a hydrodynamic retarder that can be mechanically disengaged via a disconnect clutch, wherein the wear and tear of the disconnect clutch is reduced.

SUMMARY OF THE INVENTION

The inventive method prevents situations wherein the disconnect clutch is under heavy load due to an extensive synchronization effort. Such an extensive synchronization effort occurs when during synchronization—that is during engaging of the disconnect clutch—on the one hand the working chamber of the retarder fills with working medium, in particular fills completely and on the other hand a great speed difference has to be bridged with the disconnect clutch.

It is advantageous if the working chamber of the retarder is filled, in particular completely filled with working medium in a turned-off motor vehicle in order to achieve a defined working medium level in the working medium reservoir in a connected external working medium system having a working medium system reservoir. If for example the hydrodynamic retarder is integrated into a vehicle cooling circuit, whereby the cooling medium at the same time is the working medium of the retarder, then the aforementioned working medium reservoir is the reservoir for the cooling medium whose level must be regularly checked and whereby a predetermined volume of cooling medium must be assured in the vehicle's cooling circuit that is sealed pressure tight against the environment in order to achieve a desired overpressure in the vehicle's cooling circuit. If, in a turned off state of the vehicle the working chamber is filled with working medium, whereby immediately prior to, during or immediately after initiation and/or completion of a shut-off procedure of the motor vehicle the working chamber of the hydrodynamic retarder is always filed with the same predetermined working medium volume, then this defined filling level can be assured in the reservoir.

However, at the same time this means that the working medium must be removed again from the working chamber of the hydrodynamic retarder when starting the motor vehicle after completion of the shut-off procedure which would advantageously be caused solely by the pumping effect of the retarder during operation of same. The disconnect clutch must be engaged for this. If the disconnect clutch engages only when exceeding a predefined rotational speed of the rotor of the hydrodynamic retarder or a predefined vehicle speed, then the undesirable wear and tear characteristics occur in the disconnect clutch.

According to a first embodiment of an inventive method the rotational speed of the rotor and/or a speed of the motor vehicle is therefore monitored, and the disconnect clutch is engaged below a predetermined rotational speed of the rotor and/or motor vehicle speed, regardless of a retarder activation request via the vehicle assistance system or operation of the input device by a vehicle operator. This may involve a braking system for a motor vehicle having a hydrodynamic retarder, whereby the hydrodynamic retarder comprises a revolving bladed rotor and a bladed stator or a revolving bladed rotor and a bladed counter-rotating rotor that revolves in the opposite direction thereto which jointly form a working chamber that is filled with a working medium in a braking mode and drained of the working medium in a non-braking mode. The rotor is driven in the braking mode via a drive train with an engaged disconnect clutch and whereby during the transition from the braking mode to the non-braking mode the working chamber is drained and the disconnect clutch is disengaged.

Alternatively a hydrodynamic retarder is provided, wherein the counter-rotating rotor is driven in the braking mode via a drive train with engaged disconnect clutch or wherein the stator is supported in the braking mode with an engaged disconnect clutch stationary against a static component; and the working chamber is drained during the transition from the braking mode to the non-braking mode and the disconnect clutch is disengaged. In the non-braking mode the counter-rotating rotor or the stator can then rotate freely with the rotor and a torque build-up due to a circulation flow of air and/or residual working medium in the working chamber is prevented, just like with the design version whereby the rotor that stops in the non-braking mode can be disengaged via the disconnect clutch.

In both cases the transition from the braking mode to the non-braking mode is initiated by a request made by a driver assist system that the retarder be switched off, or by an operator of the vehicle operating an input device; and the transition from the non-braking mode to the braking mode is initiated by a request made by the driver assistance system that the retarder be switched on or by an operator of the vehicle operating the input device.

According to a second embodiment of the inventive method which may comprise the two referred-to alternatives in regard to the arrangement of the disconnect clutch—on the one hand the drive connection to the rotor and on the other hand the drive connection to the stator/counter rotating rotor—the disconnect clutch is engaged in order to avoid the high wear and tear in the disconnect clutch, regardless of a request made by the vehicle assistance system to turn on the retarder or operation of the input device by a vehicle operator at the beginning of the start-up process of the motor vehicle, if the working chamber is filled with working medium during a standstill of the vehicle, at least at the beginning of the startup process.

Both embodiments of the inventive method ensure that even at low speeds of the motor vehicle or respectively low rotational speeds of the rotor or counter-rotating rotor of the hydrodynamic retarder—in the state of being filled with working medium—due to flooding in the working chamber during standstill, a synchronization or respectively engagement of the disconnect clutch occurs, which is associated with a relatively low clutch effort and thus a low wear and tear of the disconnect clutch.

One advantageous embodiment of the invention provides that the disconnect clutch is already engaged before the vehicle has reached standstill during speed reduction of the vehicle.

It is favorable if a rotational speed of the rotor and/or counter-rotating rotor and/or a speed of the motor vehicle is monitored and the disconnect clutch is completely engaged before a predetermined rotational speed of the rotor and/or counter-rotating rotor and/or speed of the motor vehicle is reached.

In order to attain the previously discussed fill level in the cooling medium reservoir in a turned off vehicle, if the cooling medium of a vehicle cooling circuit is at the same time the working medium of the hydrodynamic retarder, wherein with the vehicle cooling circuit a component of the motor vehicle, in particular the drive motor, for example the internal combustion engine is cooled the working chamber of the hydrodynamic retarder is always is filled with the same predetermined working medium volume, advantageously immediately prior to, during or immediately after initiation and/or completion of the shut-off process of the motor vehicle.

This means that the working chamber of the retarder during initiation or completion of the shut-off process is always brought to the same fill level, regardless of whether a braking request is present or was received. A constant fill level can be achieved that always the same working medium volume is adjusted in the working chamber of the retarder, in that the working chamber of the retarder is always completely filled.

Adjustment of the desired working medium volume in the working chamber is automatic when the vehicle is turned off, in other words immediately prior to the shut-off process, during the shut-off process or immediately after the shut-off process; whereby the latter does not describe the end of the downtime, but instead the end of shutting down.

The initiation of the shut-off process can for example occur through turning off or interrupting the ignition circuit (ignition), activation of an immobilizing device (for example a hand brake), by selecting the "park" position of the transmission if the vehicle is equipped with an automatic transmission, or disabling the vehicle over a longer time period subject to another characterizing signal. The turning-off process can however also be initiated simply through deactivation of, or respectively shutting off the drive motor.

The signal that characterizes the initiation and/or completion of the shut-off process immediately prior to, during, or immediately after turning off can for example occur by detecting the current position of the ignition key in the ignition. If it is moved from the current position into another position then the working chamber of the retarder can be filled or drained already prior to or during turning of the ignition key or immediately, that is also time-delayed after the ignition key has been turned into the next position or into the end position in order to attain the desired and always identical fill level.

The working chamber of the hydrodynamic retarder is advantageously filled by means of a filling device.

The working chamber of the hydrodynamic retarder is preferably filled by means of an overpressure of the working medium/cooling medium acting as gravitational pressure in the cooling circuit. This means that the retarder is arranged at a lower position than another cooling medium-conducting part of the cooling circuit, in particular than a reservoir that is provided in the cooling circuit. Therefore, only an outlet into the working chamber of the retarder needs to be opened and the cooling medium flows into the working chamber of the retarder due to gravity. Alternatively it is obviously also possible to arrange the retarder in such a way at a higher position, so that it drains itself in particular through opening of an outlet by means of gravity acting upon the working medium in the working chamber.

According to an alternative design the chamber of the hydrodynamic retarder is filled by means of a pneumatic overpressure from the vehicle pneumatic system. Compressed air can for example be applied onto a diaphragm or a piston, the latter in particular of a cylinder in order to move working medium into the working chamber. Draining in the sense of purging the working chamber of the hydrodynamic retarder by means of an overpressure, in particular a pneumatic overpressure is also possible. Instead of compressed air another medium, for example steam could also be used for purging.

One advantageous arrangement according to the invention provides that during a start-up process of the motor vehicle it is detected whether the working chamber is filled with working medium. If it is detected that the working chamber is depleted of working medium the disconnect clutch is disengaged, in particular disengaged immediately. At least during the start-up process of the motor vehicle it can be continuously detected whether the working chamber is filled with working medium or not; and as soon as a working chamber that is depleted of working medium is detected the disconnect clutch is disengaged.

The latter measure does of course not rule out that during an interim request to turn on the retarder said request receives a higher priority than the disengagement of the disconnect clutch, due to the depleted condition of the working chamber, so that the disconnect clutch remains engaged.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
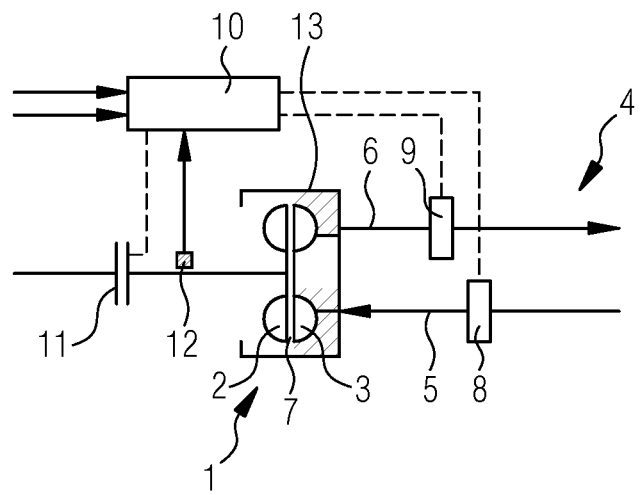
FIG. 1 is a schematic illustration of an inventively controlled hydrodynamic retarder with a disconnect clutch in the drive connection to the rotor.

FIG. 1 illustrates a hydrodynamic retarder 1 with a rotor 2 and a stator 3. The working medium is fed via a working medium feed line 5 from an external working medium circuit 4 into working chamber 7; and for cooling of the working medium that was heated in working chamber 7 is removed from retarder 1 via a working medium outlet 6. An inlet valve 8 is arranged in working medium feed line 5 and a retarder outlet valve 9 is provided in working medium outlet line 6. Retarder controller 10 accesses retarder inlet valve 8 as well as also retarder outlet valve 9, at least indirectly. Retarder inlet valve 8 is disengaged for the transition from the non-braking mode to the braking mode. Retarder outlet valve 9 is activated by a signal pressure in such a way that it causes the desired accumulation of working medium and thus the desired fill level in working chamber 7. Alternatively, a filling level control by means of a pressure application that displaces a working medium supply could also be considered.

When transitioning from braking mode to non-braking mode inlet valve 8 is closed, so that no additional working medium can flow into working chamber 7. At the same time outlet valve 9 is kept open until working chamber 7 has drained to the desired level. For this it is necessary to continue to drive rotor 2 in order to utilize its pumping effect. Consequently, disconnect clutch 11 is kept engaged until it is ensured that draining to a sufficient level has occurred.

Since the duration of draining is dependent upon the rotational speed of rotor 2 at the time of the desired shut-off, in other words when detecting a request to turn off the retarder, the rotational speed of rotor 2 is detected, for example by illustrated speed sensor 12 and is communicated to retarder controller 10. Speed sensor 12 could also be located at a different position, for example in the direction of the driving power flow before disconnect clutch 11; or the rotational speed could be provided differently to retarder controller 10, for example via CAN-bus since the rotational speed generally depends on another rotational speed in the drive train in which hydrodynamic retarder 1 is provided, for example the rotational speed of the transmission output shaft of a motor vehicle transmission or the vehicle speed in the case of a so-called secondary retarder or the motor speed in the case of a primary retarder.

Retarder controller 10 further controls disengaging and engaging of disconnect clutch 11, as indicated by the broken line. It moreover receives input signals, for example from a retarder operating lever and a driver assist system, in order to be able to detect a request to turn off the retarder.

Disconnect clutch 11 is always engaged when dropping below a predetermined rotational speed of rotor 2 and/or a predetermined speed of the vehicle. The engagement can be complete before the motor vehicle has reached standstill. Engagement of the disconnect clutch will generally occur with a drained work chamber 7 of hydrodynamic retarder 1, whereby in particular working chamber 7 remains subsequently drained and disconnect clutch 11 is kept engaged as long as no request to turn on the retarder is received, the predefined rotational speed of rotor 2 and/or the speed of the motor vehicle has not yet again been reached or the standstill or shut-off process of the motor vehicle is detected.

Figure 2:
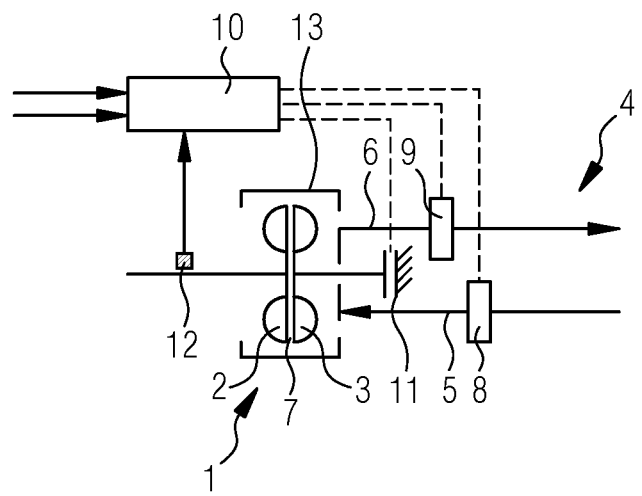
FIG. 2 is a schematic illustration of an inventively controlled hydrodynamic retarder with a disconnect clutch in the drive connection to the stator.

The embodiment according to FIG. 2 is extensively that of FIG. 1. Different, however, is herein disconnect clutch 11 in its drive connection with stator 3, so that stator 3 in the non-braking mode of hydrodynamic retarder 1 rotates with rotor 2 without a braking torque being created and in that during the transition from the non-braking mode to the braking mode braking disconnect clutch 11 is used to implement braking to the point of a standstill. Alternatively, a counter-rotating rotor could be provided in place of stator 3 that is accelerated during the transition from the non-braking mode to the braking-mode by means of disconnect clutch 11 and that is driven in the opposite direction of rotation of rotor 2.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for controlling a hydrodynamic retarder in a motor vehicle that can be mechanically disengaged via a disconnect clutch, comprising:
   a revolving bladed rotor;
   a bladed stator; and
   a working chamber formed by the revolving bladed rotor and the bladed stator;
   wherein the working chamber is filled with a working medium in a braking mode and drained of the working medium in a non-braking mode;
   wherein the revolving bladed rotor is driven in the braking mode via a drive train with the disconnect clutch engaged;
   wherein during a first transition from the braking mode to the non-braking mode, the working chamber is drained and the disconnect clutch is disengaged;
   wherein the first transition from the braking mode to the non-braking mode is initiated by a first request made by a driver assist system or by operation of an input device by an operator of the motor vehicle for the hydrodynamic retarder to be switched off; and
   wherein a second transition from the non-braking mode to the braking mode is initiated by a second request made by the driver assist system or by operation of the input device by the operator of the motor vehicle for the hydrodynamic retarder to be switched on;
   whereby at least one of a rotational speed of the revolving bladed rotor and a speed of the motor vehicle is monitored and the disconnect clutch is engaged below at least one of a pre-specified rotational speed of the revolving bladed rotor and a pre-specified speed of the motor vehicle, regardless of the second request made by the driver assist system or by operation of the input device by the operator of the motor vehicle to turn on the hydrodynamic retarder.

2. The method of claim 1, wherein the bladed stator is replaced by a bladed counter-rotating rotor that revolves in the opposite direction of the revolving bladed rotor.

3. The method of claim 1, wherein the disconnect clutch is engaged before the vehicle has reached standstill during speed reduction of the motor vehicle.

4. The method of claim 1, wherein the engagement of the disconnect clutch will occur with the working chamber of the hydrodynamic retarder being drained of the working medium, whereby the working chamber remains subsequently drained of the working medium and the disconnect clutch is kept engaged as long as no request to turn on the hydrodynamic retarder is detected, at least one of the pre-specified rotational speed of the bladed rotor and the pre-specified speed of a bladed counter-rotating rotor and a pre-specified speed of the motor vehicle is not reached, or a standstill of the motor vehicle is reached.

5. The method of claim 1, wherein the hydrodynamic retarder is integrated into a cooling circuit in the motor vehicle in such a way that it conducts a cooling medium to cool at least one component of the motor vehicle including a drive motor and an internal combustion engine, and that the cooling medium is the working medium of the hydrodynamic retarder and the working chamber of the hydrodynamic retarder is always filled with a same predetermined volume of the working medium, at least one of prior to initiation of a shut-off process, during the shut-off process, and immediately after the shut-off process of the motor vehicle.

6. The method of claim 1, wherein during a start-up process of the motor vehicle it is detected if the working chamber is filled with the working medium, and if the working chamber is drained of the working medium the disconnect clutch is disengaged.

7. The method of claim 6, wherein at least during the start-up process of the motor vehicle it is continuously detected if the working chamber is filled with the working medium, and as soon as it is detected that the working chamber is drained of the working medium the disconnect clutch is disengaged.

8. A method for controlling a hydrodynamic retarder in a motor vehicle that can be mechanically disengaged via a disconnect clutch, comprising:
   a revolving bladed rotor;
   a bladed counter-rotating rotor; and
   a working chamber formed by the revolving bladed rotor and the bladed counter-rotating rotor;
   wherein the working chamber is filled with a working medium in a braking mode and drained of the working medium in a non-braking mode;
   wherein the bladed counter-rotating rotor is driven in the braking mode via a drive train with the disconnect clutch engaged;
   wherein during a first transition from the braking mode to the non-braking mode, the working chamber is drained and the disconnect clutch is disengaged;
   wherein the first transition from the braking mode to the non-braking mode is initiated by a first request made by a driver assist system or by operation of an input device by an operator of the motor vehicle for the hydrodynamic retarder to be switched off; and
   wherein a second transition from the non-braking mode to the braking mode is initiated by a second request made by the driver assist system or by operation of the input device by the operator of the motor vehicle for the hydrodynamic retarder to be switched on;
   whereby at least one of a rotational speed of the revolving bladed rotor and the bladed counter-rotating rotor and a speed of the motor vehicle is monitored and the disconnect clutch is engaged below at least one of a pre-specified rotational speed of the revolving bladed rotor and a pre-specified speed of the bladed counter-rotating rotor and a pre-specified speed of the motor vehicle, regardless of the second request made by the driver assist system or by operation of the input device by the operator of the motor vehicle to turn on the hydrodynamic retarder.

9. The method of claim 8, wherein the disconnect clutch is engaged before the vehicle has reached standstill during speed reduction of the motor vehicle.

10. The method of claim 8, wherein the engagement of the disconnect clutch will occur with the working chamber of the hydrodynamic retarder being drained of the working medium, whereby the working chamber remains subsequently drained of the working medium and the disconnect clutch is kept engaged as long as no request to turn on the hydrodynamic retarder is detected, at least one of the pre-specified rotational speed of the revolving bladed rotor and the pre-specified speed of the bladed counter-rotating rotor and a pre-specified speed of the motor vehicle is not reached, or a standstill of the motor vehicle is reached.

11. A method for controlling a hydrodynamic retarder in a motor vehicle that can be mechanically disengaged via a disconnect clutch, comprising:
- a revolving bladed rotor;
- a bladed stator; and
- a working chamber formed by the revolving bladed rotor and the bladed stator;
- wherein the working chamber is filled with a working medium in a braking mode and drained of the working medium in a non-braking mode;
- wherein the revolving bladed rotor is driven in the braking mode via a drive train with the disconnect clutch engaged;
- wherein during a first transition from the braking mode to the non-braking mode, the working chamber is drained and the disconnect clutch is disengaged;
- wherein the first transition from the braking mode to the non-braking mode is initiated by a first request made by a driver assist system or by operation of an input device by an operator of the motor vehicle for the hydrodynamic retarder to be switched off; and
- wherein a second transition from the non-braking mode to the braking mode is initiated by a second request made by the driver assist system or by operation of the input device by the operator of the motor vehicle for the hydrodynamic retarder to be switched on;
- whereby regardless of the second request made by the driver assist system or by operation of the input device by the operator of the motor vehicle to turn on the hydrodynamic retarder, the disconnect clutch is engaged at the beginning of a start-up process of the motor vehicle if during a standstill of the motor vehicle the working chamber is filled with the working medium.

12. The method of claim 11, wherein the bladed stator is replaced by a bladed counter-rotating rotor that revolves in the opposite direction of the revolving bladed rotor.

13. The method of claim 12, wherein at least one of a rotational speed of the bladed rotor and a rotational speed of the bladed counter-rotating rotor and a speed of the motor vehicle is monitored and the disconnect clutch is completely engaged before at least one of a pre-specified rotational speed of the bladed rotor and a pre-specified speed of the bladed counter-rotating rotor and a pre-specified speed of the motor vehicle is reached.

14. A method for controlling a hydrodynamic retarder in a motor vehicle that can be mechanically disengaged via a disconnect clutch, comprising:
- a revolving bladed rotor;
- a bladed counter-rotating rotor; and
- a working chamber formed by the revolving bladed rotor and the bladed counter-rotating rotor;
- wherein the working chamber is filled with a working medium in a braking mode and drained of the working medium in a non-braking mode;
- wherein the bladed counter-rotating rotor is driven in the braking mode via a drive train with the disconnect clutch engaged;
- wherein during a first transition from the braking mode to the non-braking mode, the working chamber is drained and the disconnect clutch is disengaged;
- wherein the first transition from the braking mode to the non-braking mode is initiated by a first request made by a driver assist system or by operation of an input device by an operator of the motor vehicle for the hydrodynamic retarder to be switched off; and
- wherein a second transition from the non-braking mode to the braking mode is initiated by a second request made by the driver assist system or by operation of the input device by the operator of the motor vehicle for the hydrodynamic retarder to be switched on;
- whereby regardless of the second request made by the driver assist system or by operation of the input device by the operator of the motor vehicle to turn on the hydrodynamic retarder, the disconnect clutch is engaged at the beginning of a start-up process of the motor vehicle if during a standstill of the motor vehicle the working chamber is filled with the working medium.

15. The method of claim 14, wherein at least one of a rotational speed of the bladed rotor and a rotational speed of the bladed counter-rotating rotor and a speed of the motor vehicle is monitored and the disconnect clutch is completely engaged before at least one of a pre-specified rotational speed of the bladed rotor and a pre-specified speed of the bladed counter-rotating rotor and a pre-specified speed of the motor vehicle is reached.

* * * * *